Jan. 2, 1968  G. R. SPALENY  3,361,242
BUSINESS FORM PUNCH AND PRINT MECHANISM
Filed Jan. 19, 1966  7 Sheets-Sheet 3

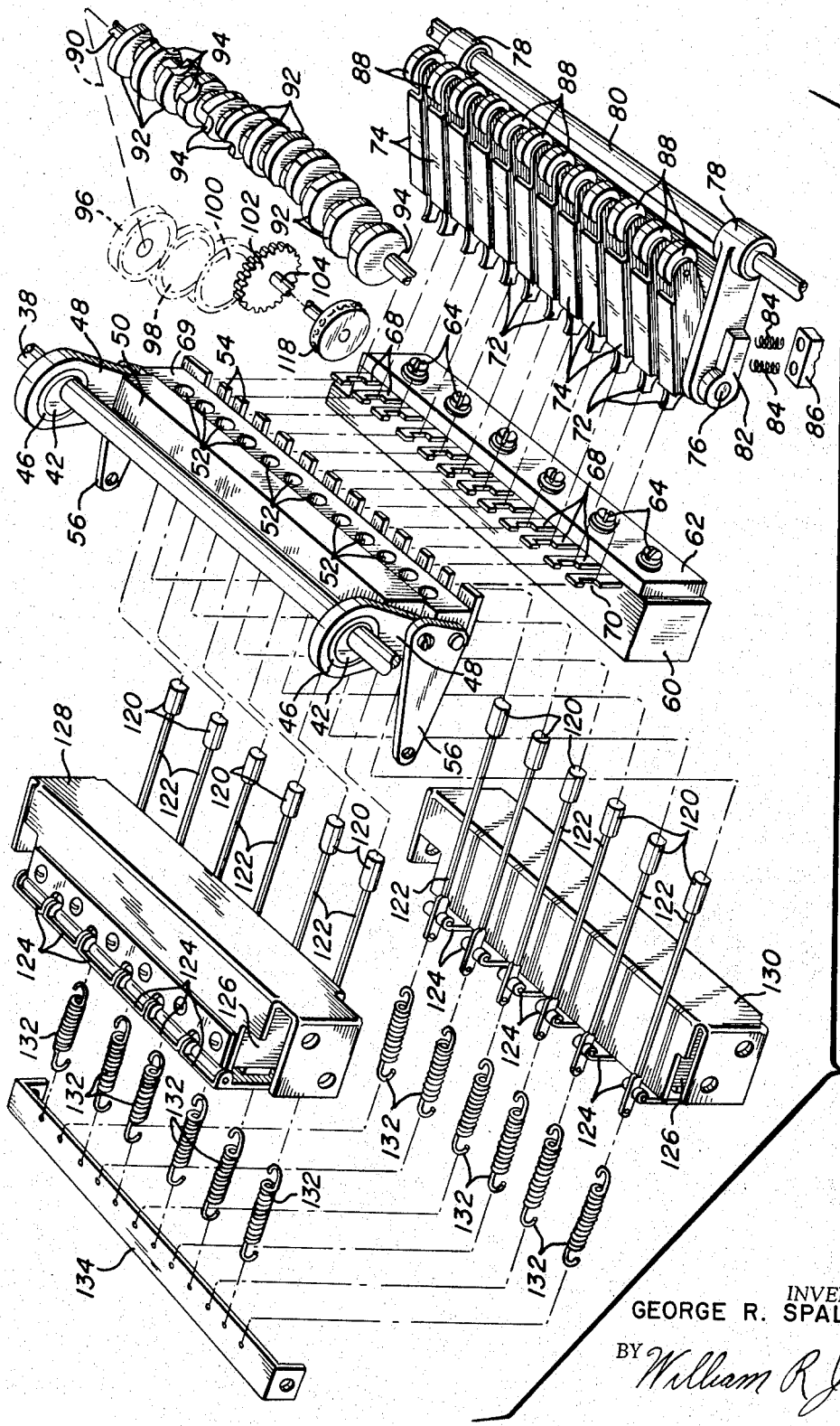

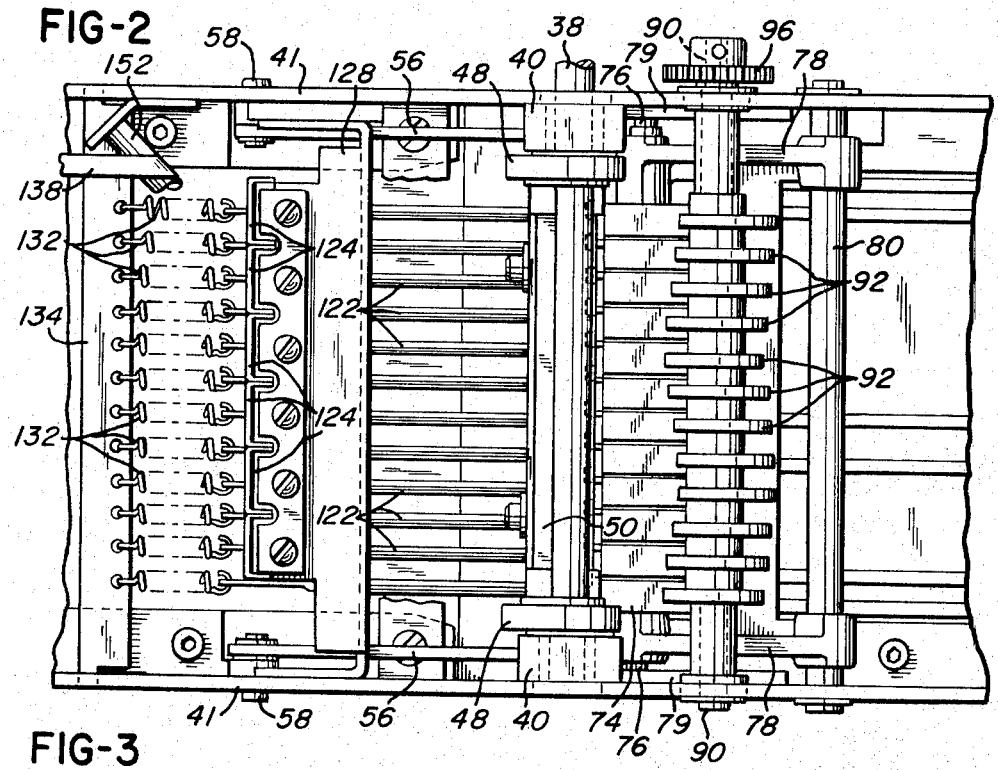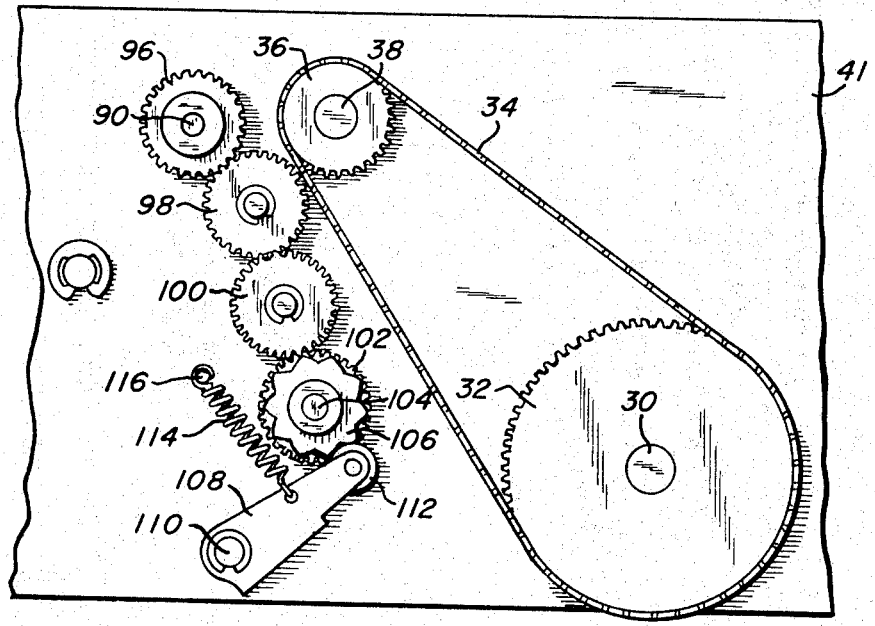

INVENTOR.
GEORGE R. SPALENY
BY William R Jacox
ATTORNEY

Jan. 2, 1968  G. R. SPALENY  3,361,242
BUSINESS FORM PUNCH AND PRINT MECHANISM
Filed Jan. 19, 1966  7 Sheets-Sheet 4
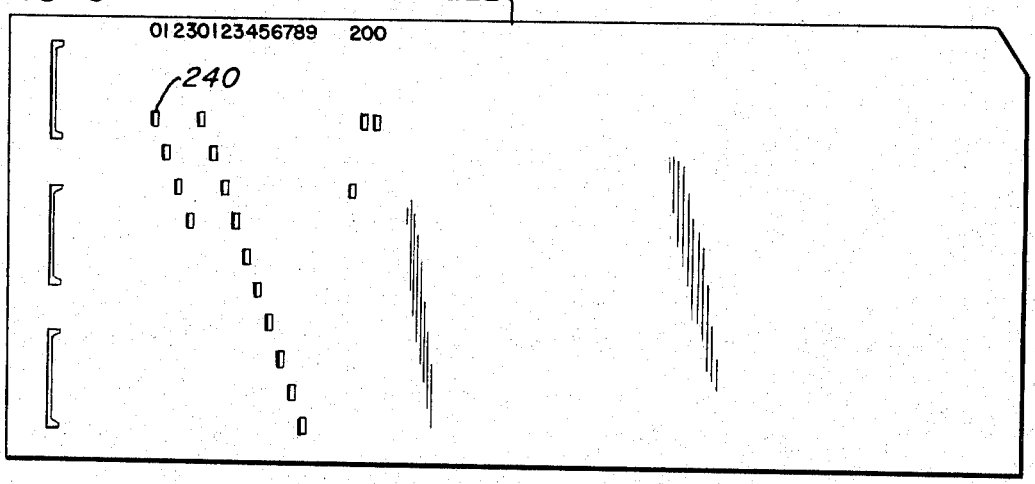
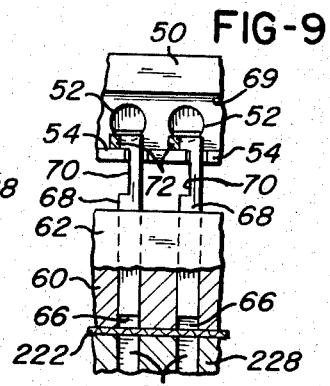
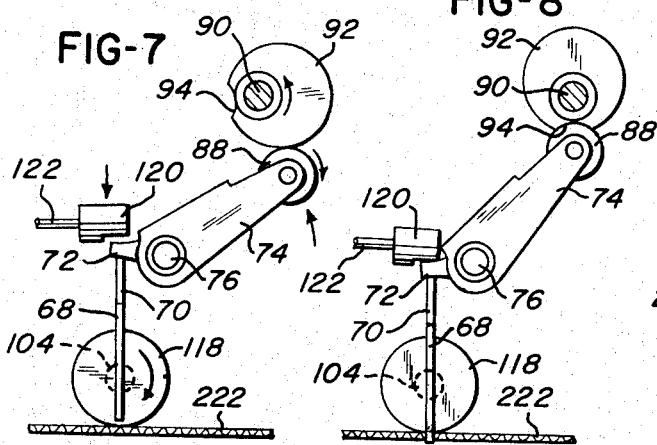
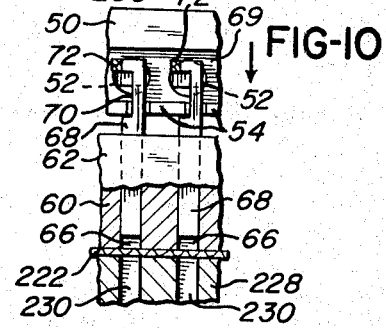
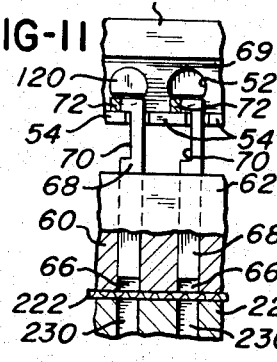
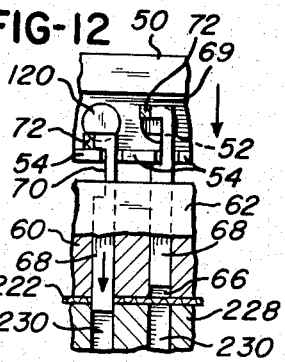
INVENTOR.
GEORGE R. SPALENY
BY William R Jacox
ATTORNEY Jan. 2, 1968

G. R. SPALENY 3,361,242

BUSINESS FORM PUNCH AND PRINT MECHANISM

Filed Jan. 19, 1966

INVENTOR.
GEORGE R. SPALENY
BY *William R Jacox*
ATTORNEY

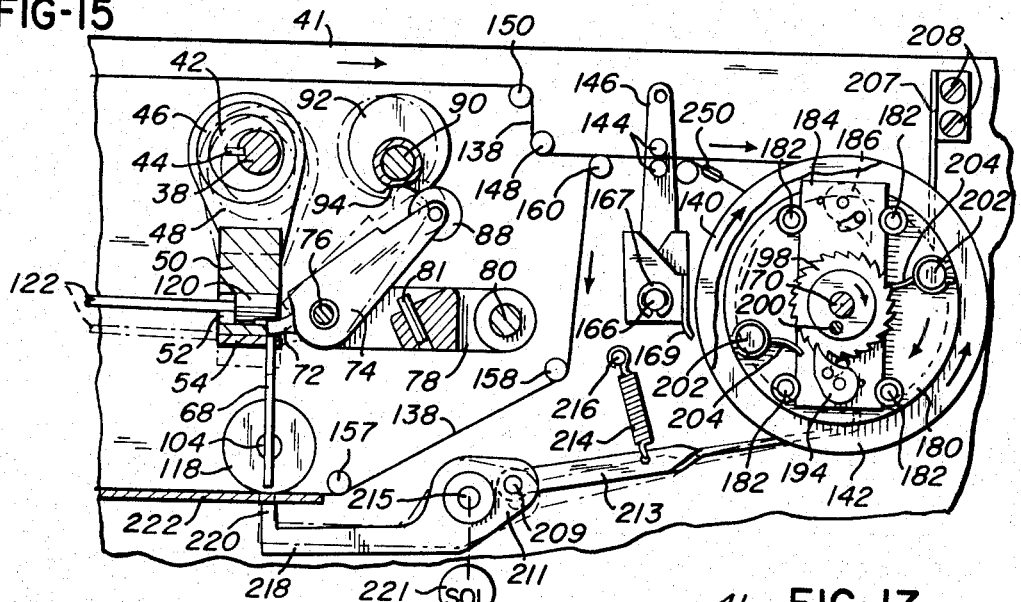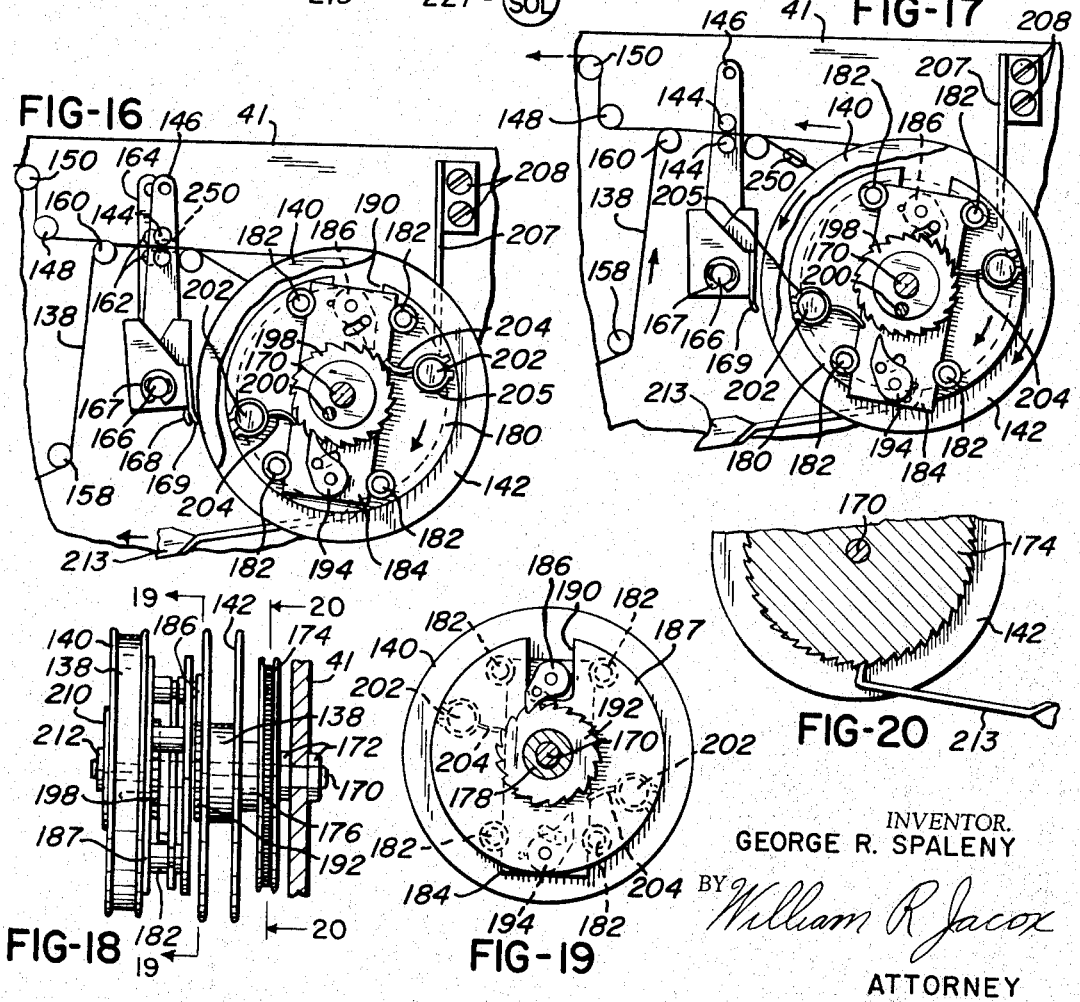

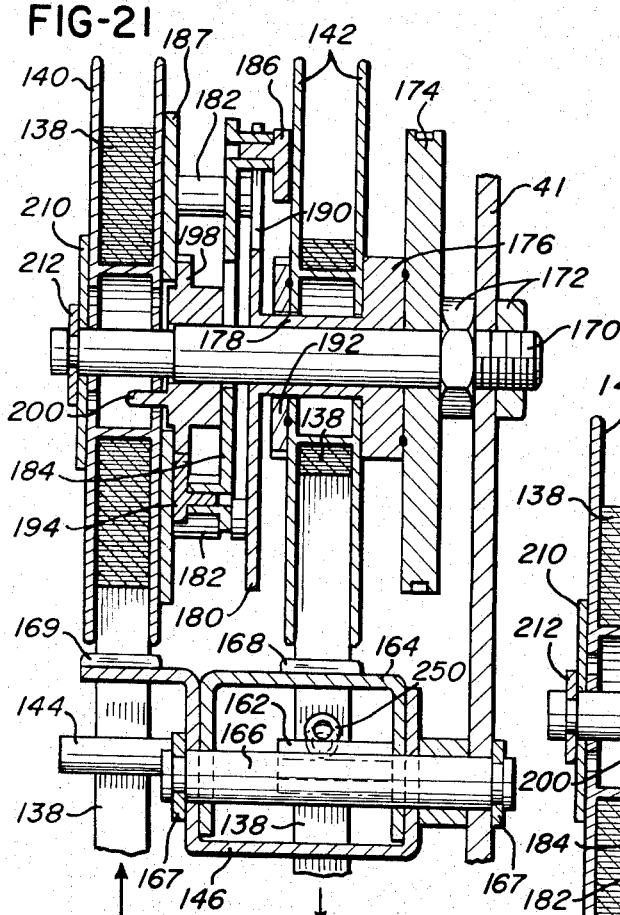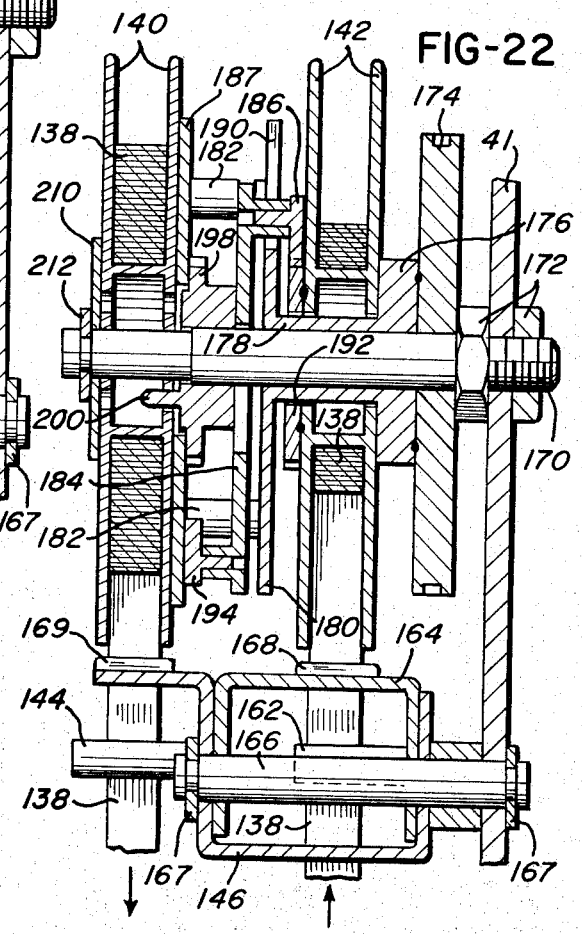

United States Patent Office 3,361,242
Patented Jan. 2, 1968

3,361,242
BUSINESS FORM PUNCH AND PRINT MECHANISM
George R. Spaleny, Dayton, Ohio, assignor to The Standard Register Company, a corporation of Ohio
Filed Jan. 19, 1966, Ser. No. 521,699
9 Claims. (Cl. 197—1.5)

This invention relates to mechanism for applying information to various types of devices or materials.

An object of this invention is to provide mechanism by which information may be quickly and accurately applied to a business form or the like or to other types of products or devices by punching and/or by printing thereupon.

Another object of this invention is to provide such mechanism by which information to be applied can be stored or immediately applied.

Another object of this invention is to provide novel mechanism by which a single operator provides both punch selection and/or print selection.

Another object of this invention is to provide novel mechanism for controlling the operation of a ribbon member which is used in providing printed information.

Another object of this invention is to provide such mechanism which can be produced in relatively small and compact physical dimensions.

Other objects and advantages reside in the construction of the invention, combinations thereof, the method of manufacture, and the mode of operation, as will become more apparent from the following description.

In the drawings:

FIGURE 1 is an exploded perspective view of mechanism of this invention.

FIGURE 2 is a top plan view of the mechanism of FIGURE 1.

FIGURE 3 is a side view of a portion of the mechanism of this invention.

FIGURE 6 is a plan view illustrating an example of a business form which may be operated upon by mechanism of this invention.

FIGURE 7 is a diagrammatic view of a portion of the punch and transfer mechanism of this invention.

FIGURE 8 is a view similar to FIGURE 7 but showing another position of operation thereof.

FIGURE 9 is a sectional view, with parts broken away, taken substantially on line 9—9 of FIGURE 4.

FIGURE 10 is a sectional view similar to FIGURE 9 but showing another position of operation of the parts illustrated.

FIGURE 11 is a sectional view similar to FIGURES 9 and 10 but showing another position of operation of the parts illustrated.

FIGURE 12 is a sectional view similar to FIGURES 9, 10 and 11 but showing another position of operation of the parts illustrated.

FIGURE 15 is a side view, with parts broken away and shown in section, of a portion of the ribbon operator mechanism of this invention.

FIGURE 16 is a side view, with parts broken away and shown in section, of a portion of the ribbon operator mechanism shown in FIGURE 15, in another position of operation thereof.

FIGURE 17 is a side view similar to FIGURE 16 but showing another position of operation of the parts illustrated.

FIGURE 18 is an elevational view of a portion of the ribbon operator mechanism of this invention.

FIGURE 19 is a sectional view taken substantially on line 19—19 of FIGURE 18.

FIGURE 20 is a fragmentary sectional view taken substantially on line 20—20 of FIGURE 18.

FIGURE 21 is an enlarged sectional view of a portion of the ribbon operator mechanism of this invention.

FIGURE 22 is an enlarged sectional view similar to FIGURE 21 but showing another position of operation of parts illustrated.

Figure 4:
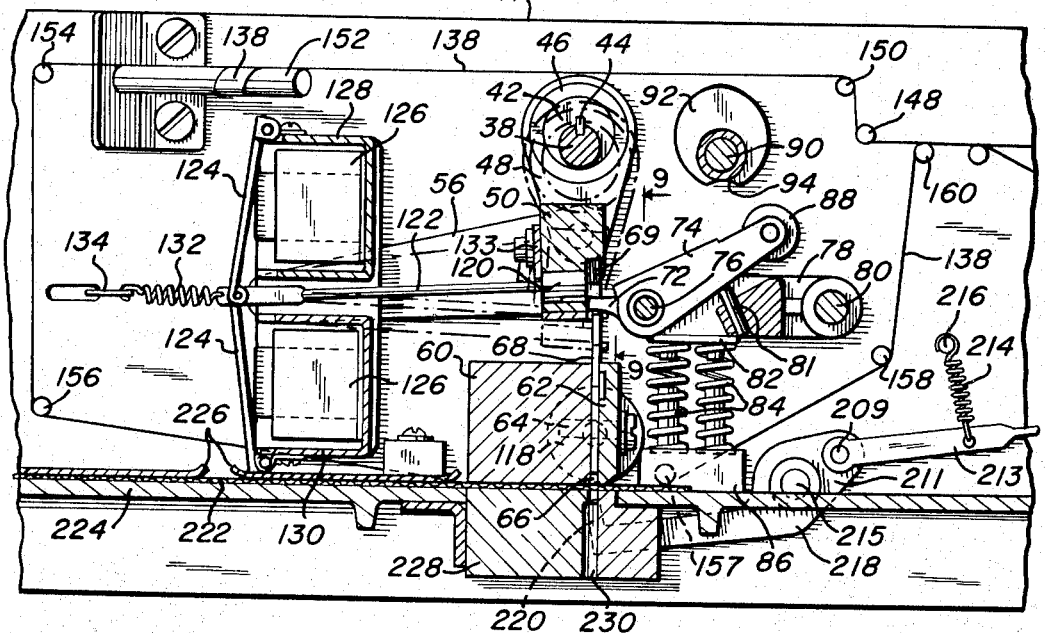
FIGURE 4 is a side view, with parts broken away, of mechanism of this invention.

Referring to the drawings in detail, mechanism of this invention includes a drive shaft 30, shown in FIGURE 3, which is rotated by any suitable motor means, not shown. The drive shaft 30 has attached thereto for rotation therewith a gear wheel 32.

A chain 34 encompasses the gear wheel 32 and a gear wheel 36 for rotation of the wheel 36 with rotation of the wheel 32. The wheel 36 is attached to a shaft 38 for rotation thereof. The shaft 38 is also shown in FIGURES 1, 2, 4, 5, 13, and 15. The shaft 38 is rotatably supported within bearing housing units 40, shown in FIGURE 2. The bearing housing units 40 are carried by support structure 41.

Figure 13:
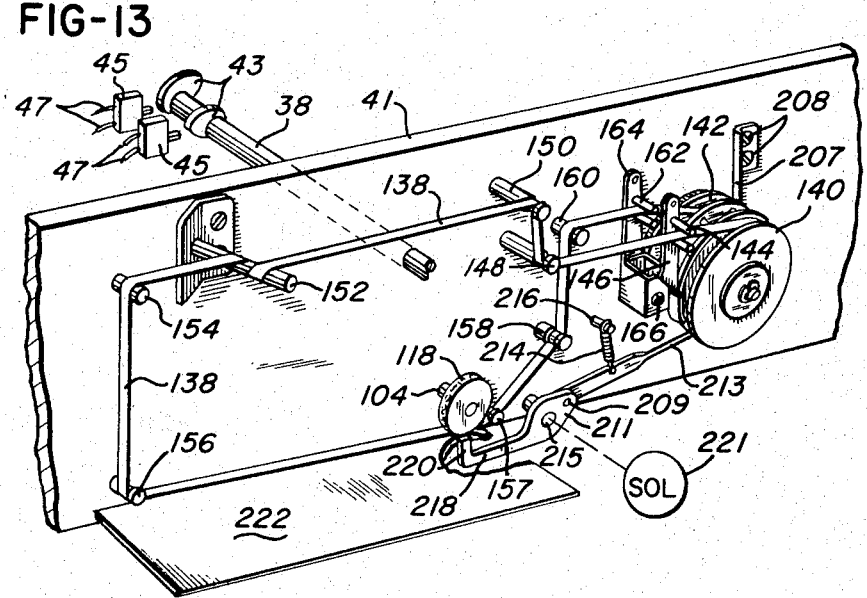
FIGURE 13 is a perspective view showing the ribbon operator mechanism of this invention.
Figure 14:
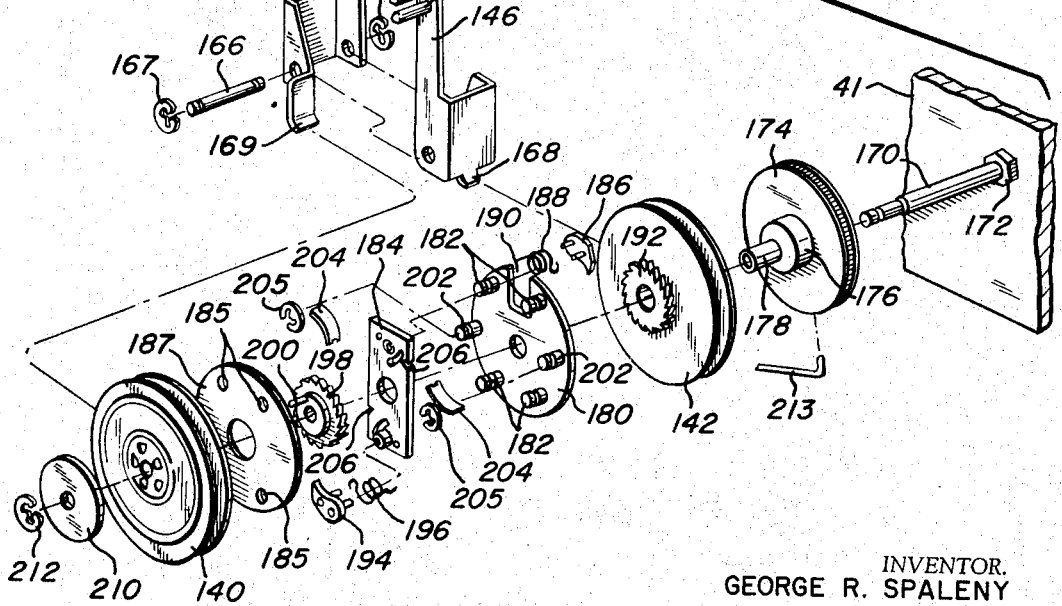
FIGURE 14 is a perspective exploded view of the ribbon operator mechanism of this invention.

As shown in FIGURE 13, the shaft 38 carries a plurality of cams 43 which engage electric switch members 45 for operation thereof. The electric switch members 45 are provided with electric leads 47 which extend therefrom.

Figure 5:
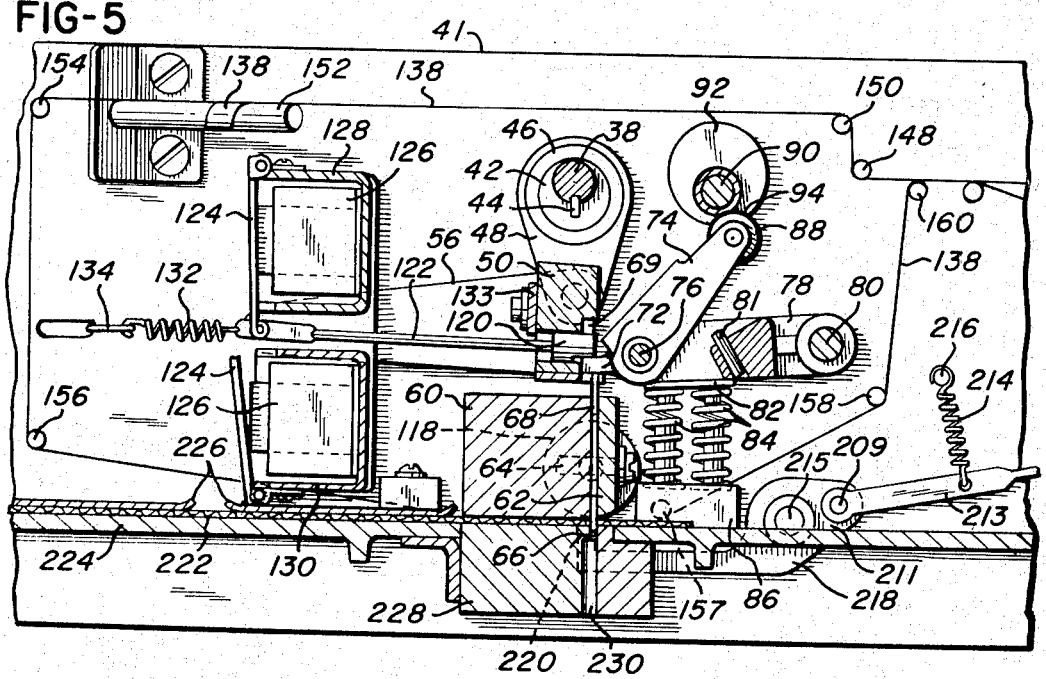
FIGURE 5 is a side view, with parts broken away, of the mechanism of FIGURE 4 but showing parts thereof in another position of operation.

As shown in FIGURES 1, 4, and 5, secured to the shaft 38 for rotation therewith are crank or cam members 42. A key member 44 is shown in FIGURES 4, 5, and 15, in connecting relationship between the shaft 38 and each crank or cam member 42. Each crank or cam member 42 is rotatably journalled within a bearing 46 which is carried within a bracket 48. The brackets 48 support an elongate carriage 50 which is provided with a plurality of holes or bores 52, herein shown as being in alignment. The carriage 50 carries a plurality of lugs 54, best shown in FIGURE 1, which are firmly attached thereto in any suitable manner. The lugs 54 are shown as being in alignment at a lower level than the level of the holes 52, with a hole 52 adjacent the lugs 54.

Attached to each bracket 48 is an arm 56 which extends therefrom. Each arm 56 is pivotally connected to the support structure 41 by means of a pin 58.

Positioned directly below the carriage 50 is an elongate block 60 which has a plate 62 attached thereto by means of bolts 64 or the like. The block 60 is firmly attached to the support structure 41 in any suitable manner, not shown. The block 60 and the plate 62 form a plurality of guide slots 66 therebetween, as shown in FIGURES 9–12. Within each guide slot 66 is slidably disposed a punch 68. Each punch 68 has the upper portion thereof adjacent one of the holes 52 of the carriage 50.

An elongate recess 69 extends along the length of the carriage 50 in communication with the bores 52, as shown in FIGURES 9, 10, 11 and 12.

Each punch 68 has an elongate notch 70 therein. Within each notch 70 is one of the lugs 54 of the carriage 50, each lug 54 and its respective punch 68 being relatively movable. Directly above each lug 54 is a tab 72 of an arm 74. A tab 72 and a punch 68 are positioned directly below each of the bores 52 in the carriage 50. The tab 72 and its respective punch 68 are adapted to move together in a manner discussed below.

The arm 74 is pivotally carried upon a shaft 76. Thus, there are a plurality of laterally aligned arms 74 carried by the shaft 76, as shown in FIGURES 1 and 2. The shaft 76 is supported by a plurality of brackets 78 which are rigidly attached to a shaft 80 for rotation therewith. Each of the arms 74 normally engages a rest member 81, as shown in FIGURE 4. One of the rest members 81 is shown in FIGURES 4 and 5 as it is carried by one of the brackets 78.

The shaft 80 is pivotally supported by the support structure 41, as shown in FIGURE 2. Each bracket 78 has a shoulder member 82, shown in FIGURES 1, 4, and 5 rigidly attached thereto, integrally or otherwise. A plurality of support springs or resilient members 84 are positioned between each shoulder member 82 and a block 86, as shown in FIGURES 4 and 5. The block 86 is firmly attached to the support structure 41 in any suitable manner, not shown. The resilient members 84 urge the brackets 78 in a direction from the blocks 86 so that the shaft 76 is in normal engagement with a locator 79, as shown in FIGURE 2. Thus, the locator 79 determines the normal pivotal position of the brackets 78.

Each arm 74 has a roller 88 rotatably carried thereby adjacent the end thereof.

Positioned above the arms 74 is a shaft 90 which is rotatably carried by the support structure 41, as shown in FIGURE 2. In alignment with each of the rollers 88 of the arms 74 is a cam 92 which is secured to the shaft 90. Each of the cams 92 is shown as being a heart-shaped cam. Each heart-shaped cam 92 has a notch 94 therein, as shown in FIGURES 4, 7, and 15, adjacent the shaft 90. The longitudinal axis of each heart-shaped cam 92 is angularly displaced slightly from the longitudinal axis of each of the other heart-shaped cams 92, as best illustrated in FIGURE 1. Thus, the notch 94 of each heart-shaped cam 92 is slightly angularly displaced with respect to the notch 94 of each of the other heart-shaped cams 92.

The shaft 90 has a gear wheel 96 attached thereto for rotation therewith, as shown in FIGURES 2 and 3. The gear 96, as shown in FIGURE 3, is in meshed relationship with an intermediate gear 98 which, in turn, is in meshed relationship with an intermediate gear 100, which is in mesh with a gear 102. The gear 102 is attached to a shaft 104 for rotation therewith.

Adjacent the gear 102, the shaft 104 has secured thereto a detent wheel 106. A detent arm 108 is pivotally carried by a pin 110 adjacent the detent wheel 106. The detent arm 108 has a roller 112 rotatably carried thereby and in engagement with the detent wheel 106. A spring 114 is attached to the detent arm 108 and to a pintle 116 and urges the detent arm 108 toward the detent wheel 106, as shown in FIGURE 3.

A print wheel 118 shown in FIGURES 1, 4, 5, 7, 8, 13, and 15 is attached to the shaft 104 for rotation therewith.

Within each of the holes or bores 52 of the carriage 50 is a plunger or interposer 120, best shown in FIGURES 1, 4, 5, 7, and 8. Each plunger or interposer 120 is slidably axially movable within its respective hole or bore 52. Each plunger or interposer 120 is attached to a rod 122. Each rod 122 is attached to an armature 124 of an electrically operable actuator 126. As shown in FIGURES 1, 4, and 5, a frame 128 carries a group of actuators 126, and a frame 130 carries a group of actuators 126, each actuator 126 having an armature 124.

A spring 132 is attached to each armature 124 and to a bar 134. Each spring 132 urges its respective rod 122 toward the bar 134. However, movement of the rod 122 toward the bar 134 is limited by engagement of the interposer 120 thereof with an abutment member 133, which is attached to the carriage 50, as shown in FIGURE 4.

A suitable arrangement is shown in which the armature 124 of each of the actuators 126 which is carried by the frame 128 is hinged at the upper portion of the frame 128. The armature 124 of each of the actuators 126 which is carried by the frame 130 is hinged at the lower portion thereof. Thus, as the frames 128 and 130 are positioned one below the other, the rods 122 and the plungers 120 are in lateral alignment as the plungers 120 are disposed within the aligned holes 52.

Ribbon control

As best shown in FIGURES 13 and 15, a ribbon 138 has a portion thereof positioned below the print wheel 118. The ribbon 138 has a portion thereof carried by a spool 140 and a portion thereof carried by a spool 142, one end portion of the ribbon 138 being carried by the spool 140 and one end portion of the ribbon 138 being carried by the spool 142. As shown in FIGURE 13, the ribbon 138 extends from the spool 140, between a pair of fingers 144 of an arm 146. The ribbon 138 partially encompasses a stud 148 and then partially encompasses a stud 150. The studs 148 and 150 are carried by the support structure 41 and extend normally therefrom. The ribbon 138 then encompasses a stud 152 as the ribbon 138 makes one convolution about the stud 152. The stud 152 is attached to the support structure 41 and extends angularly therefrom. The ribbon 138 extends from the stud 152 to a stud 154. The ribbon 138 partially encompasses the stud 154 and extends to a stud 156. The ribbon 138 partially encompasses the stud 156 and then extends to the print wheel 118. The ribbon 138 has a portion shown directly below the print wheel 118. The ribbon 138 then partially encompasses a stud 157. The ribbon 138 then extends to a stud 158 which the ribbon 138 partially encompasses. The ribbon 138 then extends to a stud 160 which the ribbon 138 partially encompasses. The ribbon 138 then extends between a pair of fingers 162 of an arm 164 and then to the spool 142.

The studs 154, 156, 158, and 160 are carried by the support structure 41 and extend normally therefrom. The arms 146 and 164 are pivotally supported upon a pin 166 which is carried by the support structure 41. Clips 167 at the ends of the pin 166 maintain the arms 146 and 164 upon the pin 166.

The arm 146 has a brake shoe 168 which is engageable with the spool 142 by pivotal movement of the arm 146. The arm 164 has a brake shoe 169 which is engageable with the spool 140 by pivotal movement of the arm 164.

The spools 140 and 142 encompass a shaft 170 which is attached to the support structure 41 by means of nuts 172, as shown in FIGURES 21 and 22. Adjacent the support structure 41 and rotatably supported by the shaft 170 is a ratchet wheel 174 which has an axial extension 176 secured thereto. The ratchet wheel 174 also has a sleeve 178 which extends along the shaft 170. The spool 142 is rotatably supported upon the sleeve 178. The sleeve 178 has attached thereto a disk or carrier member 180 which is coaxial therewith and which is disposed intermediate the spool 142 and the spool 140. The disk 180 has two pairs of spaced-apart studs 182 which are slidably engaged by a support member or slide plate 184. The slide plate 184 encompasses the shaft 170 and is movable transversely with respect thereto as the slide plate 184 is carried by the disk 180 and is guided by the studs 182. The studs 182 also extend into holes 185 of a disk 187 for rotation of the disk 187 with the disk 180. The slide plate 184 is between the disks 180 and 187.

The slide plate 184 carries a pivotally movable pawl 186 which is biased by a spring 188. A part of the pawl 186 extends through a notch 190 in the disk 180 and is adapted to engage a toothed wheel 192 which is secured to the spool 142, coaxial therewith. The toothed wheel 192 is disposed intermediate the spool 142 and the disk 180. The slide plate 184 also pivotally carries a pivotally movable pawl 194 which is biased by a spring 196. The pawl 194 is adapted to engage a toothed wheel 198 which is disposed intermediate the slide plate 184 and the disk 187. The toothed wheel 198 has an axially extending pin 200 which extends through the disk 187 and into the spool 140 for rotation therewith.

The disk 180 also has a plurality of studs 202, each of which supports a leaf spring 204. A clip 205 maintains the position of the spring 204 upon its respective stud 202. Each leaf spring 204 extends into a notch 206 of the slide plate 184. The leaf springs 204 urge movement of the slide plate 184 in a transverse direction with respect to the shaft 170. FIGURE 15 shows the slide plate 184 as it is urged into a position in which the pawl 194 is in engagement with the toothed wheel 198. FIGURE 17 shows the slide plate 184 as it is urged into a position in which the pawl 186 is in engagement with the toothed wheel 192.

A retainer 210 and a clip 212 at the end of the shaft 170 retain the elements carried thereby thereupon.

An elongate ratchet arm 213 is engageable with the ratchet wheel 174 for rotative movement thereof. A resilient leaf 207 is attached to the support structure 41 by means of screws 208. The resilient leaf 207 engages the ratchet wheel 174 and prevents reverse rotative movement thereof. As shown in FIGURES 13 and 15, the ratchet arm 213 is pivotally attached by means of a pin 209 to a tail piece 211 which is attached to a shaft 215 for rotation therewith. A spring 214 is attached to the ratchet arm 213 and to a stud 216 and urges the arm 213 toward the ratchet wheel 174.

A striker arm 218 is shown as being integrally attached to the tail piece 211. The striker arm 218 is movable with rotation of the shaft 215. The striker arm 218 has an engagement portion 220 which is disposed directly below the print wheel 118. A portion of the ribbon 138 is disposed between the engagement portion 220 of the striker arm 218 and the print wheel 118.

Any suitable rotary solenoid or stepping motor 221 or the like, illustrated diagrammtically in FIGURES 13 and 15, is mechanically connected to the shaft 215 for rotative movement thereof.

Any suitable business form 222 is shown in FIGURES 4, 5, and 13 positioned between the ribbon 138 and the engagement portion 220 of the striker arm 218. As shown in FIGURES 4 and 5, the business form 222 is slidably positioned between a support member 224 and guide members 226. The business form 222 is also positioned between the block 60 and a block 228. The block 228 is provided with an aperture 230 therein directly below each of the punch rods 68, as shown in FIGURES 4, 5, 9, 10, 11, and 12.

Operation

During operation of the mechanism of this invention the drive shaft 30 is continuously rotating. Thus, the shaft 38 is continuously rotating. Due to the fact that the cam members 42 rotate with the shaft 38, the carriage 50 is reciprocally moved in a substantially linear manner with rotation of the shaft 38.

FIGURES 4 and 15 illustrate the up and down movement of the carriage 50 during rotation of the shaft 38. As the carriage 50 reciprocally moves up and down, the plungers 120 are carried up and down with the carriage 50. The spring 132 which is attached to each rod 122 normally positions the respective plunger 120 in a recessed position within its respective bore 52. When each plunger 120 is completely recessed within its respective bore 52 as shown in FIGURE 4, up and down movement of the carriage 50 has no effect upon the punches 68, as illustrated in FIGURES 4 and 10. The lower end of each of the punches 68 normally remains within the block 60 as the carriage 50 moves up and down. This is due to the fact that as the carriage 50 moves downwardly, as shown in FIGURE 10, the upper portion of the punches 68 occupy positions within the elongate recess 69.

A business form 222, such as shown for example in detail in FIGURE 6, is positioned as shown in FIGURES 4, 5, and 13 for operation thereupon. The business form 222 is longitudinally movable between the blocks 60 and 228 by any suitable means, as any desired portion of the business form 222 is positioned below the punches 68. When a predetermined portion of the business form 222 is positioned below the punches 68, the mechanism is operated to punch information therein and to print the same information thereupon. The punches 68 are positioned normal to the business form 222 and are spaced apart across the width of the business form 222. A punched hole in any given width position of the form 222 provides a certain bit of information thereto.

As illustrated in the business form 222 of FIGURE 6, the first punch hole therein at the left represents the numeral zero (0) and is referred to by reference numeral 240. In order to provide such a zero (0) punched hole in the form 222 the proper plunger 120 is operated at the moment when the carriage 50 is at its uppermost position. Electrical circuitry is provided for detecting the uppermost position of the carriage 50. The shaft 38 has a plurality of cams 43 rotatable therewith. Each of the cams 43 operates one of the electric switches 45 and indicates the carriage 50 is at its uppermost position. Thus, a plunger 120 is operated only at a moment when one of the electric switches 45 indicates that the carriage 50 is at its uppermost position.

A suitable electric circuit is energized to actuate the proper actutaor 126. When this occurs the armature 124 of the actuator 126 pivotally moves to the right, as illustrated in the upper portion of FIGURE 5. Such movement of the armature 124 is against the resiliency of the spring 132 which is attached thereto.

As the armature 124 moves to the position thereof shown in FIGURE 5, the rod 122 which is attached thereto is moved axially so that the plunger 120 which is carried thereby is moved axially within its bore 52. Thus, the plunger 120 extends into the recess 69 and a portion of the plunger 120 becomes positioned directly above its respective punch 68 and above its respective tab 72 of its respective arm 74, as shown in FIGURES 5 and 11.

Then, as the carriage 50 moves downwardly, as illustrated in FIGURES 7, 12, and 15, the extending portion of the plunger 120 engages its respective punch 68 and its respective tab 72. Thus, the punch 68 is moved linearly and the respective tab 72 is urged downwardly. Thus, the punch 68 punches a hole, such as the hole 240, shown in FIGURE 6, in the business form 222 in the manner illustrated in FIGURES 5, 6, 8, and 12.

As such downward movement of the punch 68 occurs, the tab 72, which is engaged by the plunger 120 moves angularly downwardly, as shown in FIGURES 7 and 15. Such downward angular movement of the tab 72 causes pivotal movement of its arm 74. Thus, the arm 74 is pivotally moved upwardly, as illustrated in FIGURES 7 and 15. Thus, the roller 88 of the arm 74 engages its respective heart-shaped cam member 92. The force of the roller 88 upon its respective heart-shaped cam member 92 causes rotative movement thereof so that the notch 94 thereof moves toward the roller 88, as illustrated in FIGURE 7. The cam 92 continues to rotate until the roller 88 is positioned within the notch 94 of the cam 92, as illustrated in FIGURES 8 and 15. Rotation of the cam member 92 causes rotation of the shaft 90 to which the cam member 92 is secured. Thus, rotative movement of the cam member 92 to its position shown in FIGURES 5 and 8 results in rotation of the shaft 90 to a given rotative position.

If, for any reason, more than one arm 74 is caused to pivotally move, the brackets 78 are forced to move downwardly against the resiliency of the support springs 84. Thus, there can be only limited pressure upon the cams 92 by the arms 74. Therefore, this portion of the mechanism is protected against damage by mis-operation.

As shown in FIGURE 3, rotation of the shaft 90 causes rotation of the gear 96 attached thereto. Rotation of the gear 96 causes rotation of the gears 98, 100, and 102. As shown in FIGURE 1, the shaft 104 rotates with rotation of the gear 102. The print wheel 118 is secured to the shaft 104 for rotation therewith. Thus, the print wheel 118 is rotatively moved. The print wheel 118 has a plurality of characters thereupon. Each character upon the print wheel 118 corresponds to the information which may be punched in the business form 222 by one of the punches 68. Thus, as a punch 68 punches a bit of information into the business form 222, the print wheel 118 is rotatively moved so that a proper character thereupon faces the business form 222. The character which faces the business form 222 corresponds with the information punched into the business form 222 by the punch 68. For example, when a zero position hole is punched as illustrated by reference numeral 240 in FIGURE 6, the print wheel 118 is rotated so that the numeral 0 faces downwardly.

Then the stepping motor or rotary solenoid 221 is operated. Such operation occurs immediately following the punching operation of the punch 68. One of the cams 43 shown in FIGURE 13 and carried by the shaft 38 operates one of the electric switches 45 to indicate the proper moment at which the solenoid may be operated. Thus, the ratchet arm 213 rotatively moves the ratchet wheel 174 very slightly at the moment immediately following engagement of the striker arm 218 with the business form 222.

When the carriage 50 moves upwardly, following its downward stroke, the punch 68 and the tab 72 which have been moved by a plunger 120 are returned to their normal positions by upward movement of the lug 54 which is directly therebelow.

As discussed above, the ratchet wheel 174 shown in FIGURES 14–22 has attached thereto the disk 180 for rotation therewith. The disk or carrier 180 carries the slide plate 184 which supports the pawls 186 and 194. FIGURE 15 shows the pawl 194 in engagement with the toothed wheel 198. Thus, rotative movement of the ratchet wheel 174 causes the pawl 194 to rotatively move the toothed wheel 198, as illustrated in FIGURE 15. The pin 200 attaches the toothed wheel 198 to the spool 140 so that the spool 140 rotatively moves with rotative movement of the toothed wheel 198. Thus, the ribbon 138 is drawn slightly further upon the spool 140. Thus, each operation of the ratchet wheel 174, as shown in FIGURES 15 and 16, winds the ribbon 138 a slight degree upon the spool 140 and unwinds the ribbon 138 a slight degree from the spool 142.

FIGURE 15 shows a bead 250 which is attached to the ribbon 138. As the end portion of the ribbon 138 carried by the spool 142 unwinds therefrom, the bead 250 is carried by the ribbon 138 toward the fingers 162 of the arm 164, as shown in FIGURE 15. When the bead 250 reaches the fingers 162 of the arm 164, the bead 250 engages the fingers 162 and further movement of the bead 250, with movement of the ribbon 138, causes pivotal movement of the arm 164, as illustrated in FIGURE 16. When the arm 164 pivotally moves, the brake shoe 169 is moved into engagement with the spool 140, as illustrated in FIGURES 16 and 21. Thus, rotative movement of the spool 140 is prevented. However, as the ratchet wheel 174 is further rotated by the ratchet arm 213, as illustrated in FIGURE 16, the disk 180 is rotatively moved through the attachment thereof to the ratchet wheel 174 through the sleeve 178. Thus, the pressure of the pawl 194 upon the toothed wheel 198 increases as the pawl 194 urges rotation of the toothed wheel 198 and the spool 140. However, due to the fact that the spool 140 is braked by the brake shoe 169 and cannot rotate, increased pressure upon the pawl 194 forces movement of the pawl 194 in a direction away from the toothed wheel 198. Due to the fact that the pawl 194 is carried by the slide plate 184, such forces upon the pawl 194 move the slide plate 184 in a direction which moves the pawl 194 away from the toothed wheel 198. Such movement of the slide plate 184 moves the pawl 186 into engagement with the toothed wheel 192 which is attached to the spool 142. Therefore, the spool 142 is rotatively driven by rotative movement of the ratchet wheel 174. Thus, the direction of movement of the ribbon 138 is reversed, as illustrated in FIGURES 17, 19, and 22.

When reverse direction of movement of the ribbon 138 occurs, the bead 250 moves in a direction away from the fingers 162 of the arm 164 and pressure upon the arm 164 is released so that pressure of the brake shoe 169 upon the spool 140 is released. Thus, the brake shoe 169 is released from engagement with the spool 140. Therefore, continued rotative movement of the ratchet wheel 174 causes the ribbon 138 to be wound upon the spool 142 and the spool 140 freely rotates to permit the ribbon 138 to be unwound therefrom.

Therefore, as the ratchet arm 213 continues to cause rotative movement of the ratchet wheel 174, the ratchet wheel 174 always rotates in the same direction. The spools 140 and 142 are coaxial and in adjacent relationship. Automatic reversal of the movement of the ribbon 138 occurs when a bead 250 which is adjacent each end portion of the ribbon 138 moves a sufficient distance from its respective spool 140 or 142.

It is noted that the ribbon 138 as it extends from the spool 142 is spaced a given distance from the support structure 41 as it passes below the print wheel 118. The ribbon 138 as it extends from the spool 140 is spaced a greater distance from the support structure 41. As discussed above, the ribbon 138 has one convolution thereof encompassing the stud 152 which is disposed at an angle with respect to the support structure 41. Thus, the ribbon 138 has a portion thereof extending from the stud 152 directly in alignment with the spool 140. The ribbon 138 has a portion thereof extending from the stud 152 directly in alignment with the spool 142. Thus, the stud 152 provides means by which the ribbon 138 may be aligned with both of the spools 140 and 142, even though the spools 140 and 142 are in spaced apart coaxial positions.

The business form 222 shown in FIGURE 6 is longitudinally movable between the blocks 60 and 228 for providing the information thereto which is shown in FIGURE 6, in addition to that discussed above and in the manner discussed above.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

The invention having thus been described, the following is claimed:

1. Apparatus of the type described comprising:
   a rotary shaft,
   crank means attached to the rotary shaft,
   a carriage member connected to the crank means so that the carriage member reciprocally moves substantially linearly with rotation of the rotary shaft,
   a plurality of axially movable plunger members carried by the carriage member,
   a plurality of punch members disposed adjacent the carriage member, each of the punch members being linearly movable in the directions of movement of the carriage member,
   a plurality of arm members, there being an arm member pivotally carried adjacent each of the punch members,
   a rotary shaft disposed adjacent the arm members,
   a plurality of heart-shaped cams attached to the rotary shaft and rotatable therewith, there being one heart-shaped cam for each of the arm members and engageable thereby for rotative movement thereof,
   a print member,
   means operably connecting the print member to said rotary shaft which is disposed adjacent the arm members,
   each of the plunger members being selectively movable to a position to engage its respective punch member and arm member for movement thereof when the carriage member is moved toward the punch member and arm member, the respective arm member being pivotally moved with linear movement of the punch member, pivotal movement of the arm member causing engagement thereof with its respective heart-shaped cam member causing rotation thereof and thus causing rotation of the rotary shaft so that the print member is operated.

2. Apparatus of the type described comprising:
a reciprocally linearly movable carriage member,
a plurality of abutment members movably carried by the carriage member,
a plurality of punch members, there being one punch member for each of the abutment members,
each of the abutment members being normally positioned out of engagement with its respective punch member when the carriage member is moved so that movement of the carriage member does not move the respective punch member, each of the abutment members being movable into a position to engage its respective punch member when the carriage member is moved for movement of the respective punch member with movement of the carriage member,
rotary transfer means,
a plurality of rotary cam members connected to the rotary transfer means for rotative movement thereof,
a plurality of cam operator members, there being one cam operator member adjacent each of the punch members and movable therewith, each cam operator member being engagable with one of the cam members for rotary movement thereof and for rotary movement of the rotary transfer means,
print means,
means operably connecting the print means to the rotary transfer means for operation of the print means with rotation of the rotary transfer means.

3. Apparatus of the type described comprising:
reciprocally linearly movable carriage means,
abutment means carried by the carriage means and adjustably positionable with respect thereto,
punch means adjacent the carriage means, the punch means being operable to punch information,
cam means,
cam operator means engageable with the cam means for operation of the cam means, the cam operator means being adjacent the carriage means,
the abutment means being normally positioned out of engagement with the punch means when the carriage means is moved so that movement of the carriage means does not cause movement of the punch means, the abutment means being adjustably positionable with respect to the carriage means so that the abutment means engages the punch means and the cam operator means for operation thereof with movement of the carriage means,
print means for printing information,
means connecting the cam means to the print means for operation thereof with operation of the cam means so that the information printed by the print means conforms with the information punched by the punch means.

4. Apparatus for operation upon a business form comprising:
reciprocally substantially linearly movable carriage means,
abutment means carried by the carriage means,
punch means for punching information, the punch means being adjacent the carriage means,
cam means,
cam operator means engageable with the cam means for operation of the cam means, the cam operator means being adjacent the carriage means,
the abutment means being adjustably positionable with respect to the carriage means so that the abutment means simultaneously engages the punch means and the cam operator means for movement thereof with movement of the carriage means, the abutment means normally being positioned so that the abutment means does not engage the punch means and the cam operator means with movement of the carriage means,
print means for printing information,
means for connecting the cam means to the print means for operation thereof with operation of the cam means for printing information which conforms to the information punched by the punch means,
striker means adjacent the print means,
ribbon means having a portion thereof intermediate the print means and the striker means,
a business form being positionable between the ribbon means and the striker means, the striker means being engageable with a portion of a business form so positioned for forcing the portion of the business form into engagement with the ribbon and thus forcing the ribbon into engagement with the print means for printing upon the business form when the striker means engages the portion of the business form,
means operably connected to the striker means and to the ribbon means for operation of the ribbon means with operation of the striker means.

5. In apparatus for providing information to a business form,
a carriage member,
a plurality of abutment members adjustably carried by the carriage member,
a plurality of punch members, there being one punch member for each of the abutment members, each punch member being operable to punch a given bit of information, the information punched by each punch member being different from the information punched by another punch member,
means for producing relative reciprocal movement between the carriage member and the punch members,
means for adjusting the position of any of the abutment members with respect to the carriage member so that any of the abutment members may be positioned for engagement with its respective punch member upon said relative reciprocal movement between the carriage member and the punch members for punching a business form,
a plurality of cam operator members, there being one cam operator member for each of the punch members and adjacent thereto,
print means, the print means including means for printing information which conforms to each bit of information which is punched by the punch members,
cam means engageable by one of the cam operator members for operation thereby,
means operably connecting the cam means to the print means, each cam operator member causing operation of the cam means to operate the print means for producing printed information corresponding to the information punched by the punch member which is adjacent the cam operator member.

6. Apparatus of the type described comprising:
reciprocally linearly movable carriage means,
a plurality of abutment members adjustably carried by the carriage means,
print means, the print means including means for printing any one of a plurality of bits of information,
cam means operably connected to the print means for operation thereof,
a plurality of cam operator members, there being one cam operator member for each abutment member, each cam operator member being engageable with the cam means for causing a given operation of the cam means for operation of the print means for printing a bit of information different from another bit of information,
each abutment member being normally positioned out of engagement with its respective cam operator member when the carriage means moves so that movement of the carriage means does not move the respective punch member, each abutment member being positionable to engage its respective cam operator member with movement of the carriage means for operation of the cam means and for operation of the print means for printing a given bit of information.

7. Apparatus of the type described comprising:
arm support structure,
a plurality of arm members pivotally carried by the arm support structure,
resilient means in supporting relationship to the arm support structure,
a plurality of rotary cam members, there being one cam member for each of the arm members and engageable thereby for rotation thereof,
means joining the cam members together for simultaneous rotation thereof,
engagement of each arm member with its respective cam member causing rotative movement thereof to a rotative position different from the rotative position of any of the other cam members,
simultaneous engagement of more than one arm member with respective cam members causing movement of the arm support structure against the resiliency of the resilient means so that the pressure of engagement of the arm members with the cam members is limited to a negligible amount.

8. Apparatus of the type described comprising:
reciprocally movable carriage means, the carriage means being in continuous reciprocal movement during operation of the apparatus,
a plurality of adjustably movable abutment members carried by the carriage means,
a plurality of punch members for punching information, the punch members being adjacent the carriage means, there being one punch member for each of the abutment members,
print means for printing information, the print means being operable to print information which corresponds to information punched by the punch members,
a plurality of transfer members each of the transfer members having a portion adjacent the carriage means, there being one transfer member for each of the punch members, each of the transfer members being operably connected to the print means for operation of the print means to print information corresponding to the information punched by the respective punch member,
each abutment member being adjustably positionable to engage its respective punch member and transfer member with movement of the carriage member so that a punch member punches information and the print means is operated for printing corresponding information.

9. The apparatus of claim 8 in which the transfer members include cam means and cam operator members, the cam operator members being engageable with the cam means for operation thereof.

References Cited

UNITED STATES PATENTS

| | | | |
|---|---|---|---|
| 682,197 | 9/1901 | Hollerith | 83—213 XR |
| 1,182,309 | 5/1916 | Peirce | 197—1.5 |
| 1,266,230 | 4/1918 | Dosch | 197—1.5 |
| 2,013,540 | 9/1935 | Kolm et al. | 197—1.5 |
| 2,800,181 | 7/1957 | Taynton et al. | 234—100 |
| 2,993,642 | 7/1961 | Fender et al. | 234—37 |
| 3,063,622 | 11/1962 | Nold | 234—100 |
| 3,215,244 | 11/1965 | Hickerson | 197—1.5 |

ROBERT E. PULFREY, *Primary Examiner.*

E. S. BURR, *Assistant Examiner.*